(12) United States Patent
Lim et al.

(10) Patent No.: US 7,713,450 B2
(45) Date of Patent: May 11, 2010

(54) PHOTOCROMIC PRIMER COMPOSITION HAVING HIGH IMPACT RESISTANCE AND TRANSPARENT MATERIAL COATED WITH THE SAME

(75) Inventors: Sung Hyun Lim, Daejeon (KR); Se Hui Han, Seoul (KR); Sung Hoon Jang, Daejeon (KR)

(73) Assignee: LG Chem. Ltd., Seoul (KR)

( * ) Notice: Subject to any disclaimer, the term of this patent is extended or adjusted under 35 U.S.C. 154(b) by 687 days.

(21) Appl. No.: 10/566,446

(22) PCT Filed: Aug. 6, 2004

(86) PCT No.: PCT/KR2004/001976

§ 371 (c)(1),
(2), (4) Date: Apr. 23, 2007

(87) PCT Pub. No.: WO2005/014739

PCT Pub. Date: Feb. 17, 2005

(65) Prior Publication Data

US 2007/0275234 A1    Nov. 29, 2007

(30) Foreign Application Priority Data

Aug. 6, 2003   (KR) ...................... 10-2003-0054390

(51) Int. Cl.
*G02B 5/23* (2006.01)
*C08G 18/02* (2006.01)
*C08G 18/58* (2006.01)

(52) U.S. Cl. .................. 252/586; 524/500; 524/513; 524/538

(58) Field of Classification Search ................ 252/586; 524/500, 513, 538
See application file for complete search history.

(56) References Cited

U.S. PATENT DOCUMENTS

| 4,260,696 | A | * | 4/1981 | Blount ...................... 525/477 |
| 4,889,413 | A |   | 12/1989 | Ormsby et al. |
| 4,931,220 | A |   | 6/1990 | Haynes et al. |
| 6,011,078 | A | * | 1/2000 | Reich et al. .................. 522/86 |
| 6,060,001 | A |   | 5/2000 | Welch et al. |
| 6,107,396 | A |   | 8/2000 | Kweon et al. |
| 6,187,444 | B1 |  | 2/2001 | Bowles, III et al. |
| 6,268,055 | B1 |  | 7/2001 | Walters et al. |
| 6,433,043 | B1 |  | 8/2002 | Misura et al. |
| 6,436,525 | B1 |  | 8/2002 | Welch et al. |
| 6,642,303 | B2 | * | 11/2003 | Schutze et al. .............. 524/589 |

FOREIGN PATENT DOCUMENTS

| JP | 63-098653 | 4/1988 |
| JP | 03-269507 | 12/1991 |
| JP | 05-028753 | 2/1993 |
| JP | 08-054501 | 2/1996 |
| WO | WO 02/04535 A1 | 1/2002 |

* cited by examiner

*Primary Examiner*—Thao T. Tran
(74) *Attorney, Agent, or Firm*—McKenna Long & Aldridge LLP

(57) ABSTRACT

Disclosed are a primer composition having photochromic property and impact resistance for coating transparent materials and a photochromic transparent material having a primer layer formed by coating and curing the primer composition. The primer composition for coating transparent materials comprises: a) 5-90 parts by weight of a polyurethane containing Brønsted salt; b) 5-50 parts by weight of a polyepoxy resin; and c) 140 parts by weight of a photochromic dye, based on 100 parts by weight of the total primer composition. The photochromic transparent material having a primer layer formed by coating and curing the primer composition shows excellent photochromic property and impact resistance.

17 Claims, No Drawings

PHOTOCROMIC PRIMER COMPOSITION HAVING HIGH IMPACT RESISTANCE AND TRANSPARENT MATERIAL COATED WITH THE SAME

This application claims priority to PCT/KR2004/001976 filed on Aug. 6, 2004, and Korean Application No. 10-2003-0054390 filed Aug. 6, 2003, in Korea, all of which are hereby incorporated by reference in their entirety.

TECHNICAL FIELD

The present invention relates to a primer composition having photochromic property and impact resistance for coating transparent materials and to a photochromic transparent material having a primer layer formed by coating and curing the primer composition.

BACKGROUND ART

The primer composition for coating transparent materials according to the present invention is applied to various transparent materials requiring transparency such as lenses for glasses, glass for cars, optical lenses, optical films, etc. Raw materials for transparent materials include plastics and glass. Among these, plastic lenses have strong breaking resistance and a lighter weight compared to glass and thus are largely used as substitutes for transparent glass. Particularly, plastic lenses are widely used in the field of optical lenses or lenses for glasses.

Materials for transparent plastic lenses include polyallylcarbonate, acrylic resin or polythiourethane. Such materials for transparent plastic lenses have soft surfaces and tend to be cracked or scratched. Therefore, such materials have a need of surface reinforcement, for example, by a silicone-based hard coating. However, a silicone-based hard coating is problematic in that it decreases impact resistance of a plastic lens. Accordingly, in order to prevent such a problem, it is necessary to coat a primer layer between a plastic lens and a hard coating layer.

Japanese Laid-Open Publication No. H8-54501 discloses a method for improving impact resistance of a plastic lens, wherein a layer formed of urethane-based resin is used as a primer layer.

Meanwhile, use of a photochromic compound as a primer layer has been disclosed in the prior art. For example, Japanese Laid-Open Publication No. H3-269507 discloses a photochromic lens comprising a plastic substrate, a hard coating layer formed of silicone resin and a primer layer between the plastic substrate and the hard coating layer, the primer layer containing a photochromic substance. In addition, use of photochromic coating composition is disclosed in several patent publications including Japanese Laid-Open Publication No. H5-28753 and U.S. Pat. Nos. 4,889,413, 6,107,396, 6,187,444, 6,268,055, 6,060,001 and 6,436,525.

However, when a photochromic dye combined with polyurethane is coated on a plastic substrate as a primer coating layer, there are problems in that the optical density is low and the bleaching rate is also low. Additionally, when the thickness of a primer layer is increased to 10 μm or more so as to obtain a high optical density, the hardness of a hard coating layer is decreased after applying the hard coating layer.

Generally, important factors to evaluate a photochromic lens are a high activation/bleaching rate, a high optical density (OD) and fatigue resistance. Among these factors, fatigue resistance can be improved by the selection of a suitable matrix and the addition of a UV stabilizer, etc. Therefore, it is necessary to increase the optical density of a lens while maintaining a desired activation/bleaching rate. Particularly, it is an imminent subject in the field of photochromic primer coatings to improve the optical density. The most important factors determining the optical density of an organic photochromic dye are a structure of the dye itself and environments of the dye. However, these factors have not been considered heretofore in photochromic primer compositions according to the prior art.

DISCLOSURE OF THE INVENTION

The present inventors have found that when a photochromic dye is used to apply a photochromic primer coating layer on a transparent plastic material, a high optical density can be obtained even at a small coating layer thickness if the environment of the dye is polar. Because the polarity of environments of the dye increases, the activated dye molecules are more stabilized. Additionally, they have found that as a free volume present in constitutional elements of a primer composition increases, reversible activation/bleaching of a photochromic dye is facilitated and thus the activation/bleaching rate increases.

Therefore, the present invention has been made based on these findings. It is an object of the present invention to provide a primer composition for coating transparent materials and a transparent material having a primer layer formed by coating and curing the primer composition, wherein the primer composition comprises a polyurethane containing a Brønsted salt, a polyepoxy resin and a photochromic dye.

According to an aspect of the present invention, there is provided a primer composition for coating transparent materials, comprising: (a) 5-90 parts by weight of a polyurethane containing a Brønsted salt; (b) 5-50 parts by weight of a polyepoxy resin; and (c) 1-40 parts by weight of a photochromic dye, based on 100 parts by weight of the total primer composition.

According to another aspect of the present invention, there is provided a photochromic transparent material having a primer layer formed by coating and curing the above-described primer composition on the surface of the transparent material.

The foregoing and other objects, features and advantages of the present invention will be explained in detail hereinafter.

In the primer composition according to the present invention, the first component, i.e., the polyurethane is characterized by containing a Brønsted salt and thus having polarity. The Brønsted salt provides the photochromic dye contained in the primer layer formed by the primer composition with polar environment.

Such effect may be explained as follows: most photochromic dyes such as merocyanine may be transformed into an activated state having a zwitterion by a cleavage of a certain chemical bond in the original structure of the dye, when exposed to UV, etc. By virtue of the polyurethane containing a Brønsted salt, the activated photochromic dye can be provided with polar environment. When UV is irradiated, such polar environment can stabilize the activated dye and can minimize the progress of a reverse reaction so that a strongly activated state can be maintained. Therefore, even if the photochromic primer coating layer has a small thickness, a high optical density can be accomplished.

According to the present invention, the Brønsted salt in the polyurethane may be provided by a reaction product between an aminodiol and a Brønsted acid. Such a Brønsted salt formed of an anionic conjugate base of a Brønsted acid and a cationic amine stabilizes an activated photochromic dye having zwitterions so that a high optical density can be obtained.

Other physical properties of polyurethane are determined by characteristics of a polyol and an isocyanate used in the preparation of the polyurethane. Particularly, physical properties of polyurethane may be determined by controlling the ratio of a hard segment to a soft segment in the polyurethane through the kind and amount of the polyol. The soft segment of polyurethane is produced by the reaction of an isocyanate and a high molecular weight polyol such as a polyester polyol or polyether polyol. The soft segment provides the photochromic dye with a free space required to perform a reversible reaction and provides a transparent material to which the primer composition according to the present invention is applied with impact resistance. The hard segment of polyurethane is produced by the reaction between an isocyanate with a low molecular weight polyol. The hard segment improves mechanical strength, heat resistance and chemical resistance of a coating layer formed by the primer composition according to the present invention.

Examples of the polyurethane containing a Brønsted salt that may be used in the present invention include Estane 5778, Estane 5707, Estane 5701, etc., available from Noveon, Inc. Among these, the polyurethane, Estane 5778 is a thermosetting polyurethane resin containing an aromatic polyester functional group. Estane 5778 can disperse metal oxides, pigments, etc., stably and has a high solubility to a solvent such as methylethyl ketone, dimethylformamide, tetrahydrofuran, cyclohexanone, or the like. It is largely used in the manufacture of recording media such as videotapes, audiotapes, etc.

Since the polyurethane containing a Brønsted salt is a reaction product of an isocyanate with a polyol, the primer composition of the present invention may include a polyurethane reaction mixture (reaction mixture for preparing polyurethane) comprising an isocyanate and a polyol, instead of the polyurethane.

The isocyanate component used in the preparation of the polyurethane containing a Brønsted salt is preferably an aliphatic isocyanate, an alicyclic isocyanate, an aromatic isocyanate, a heterocyclic isocyanate, a blocked aliphatic isocyanate or a blocked alicyclic isocyanate. More particularly, preferred examples of the isocyanate component include diisocyanates such as hexamethylene diisocyanate, 1,3,3-trimethyl hexamethylene diisocyanate, isophorone diisocyanate, toluene-2,6-diisocyanate, 4,4'-dicyclohexylmethane diisocyanate, etc.

Preferably, the polyol used in the preparation of the polyurethane containing a Brønsted salt includes: (i) a diol containing a Brønsted salt, (ii) a polyol generating a soft segment of polyurethane, and (iii) a polyol generating a hard segment of polyurethane.

The diol (i) containing a Brønsted salt may be a reaction product of an aminodiol with a Brønsted acid. The aminodiol may be prepared by conventional methods well known to persons skilled in the art. Particular examples of the aminodiol include 2-amino-2-methyl-1,3-propanediol, N-(n-butyl) diethanolamine, 3-diethylamino-1,2-propanediol, N-(t-butyl)diethanolamine, N-methyldiethanolamine, N-phenyldiethanolamine, diethyl N,N-bis(2-hydroxyethyl) aminomethyl phosphonate, etc.

The Brønsted acid to be reacted with the aminodiol may include phosphonic acid, phosphinic acid or sulfonic acid. Preferred examples of the Brønsted acid include methylphosphonic acid, ethylphosphonic acid, propylphosphonic acid, butylphosphonic acid, t-butylphosphonic acid, methylenediphosphonic acid, 2-chloroethylphosphonic acid, phenylphosphonic acid, phosphonoacetic acid, phosphonopropionic acid, methanesulfonic acid, ethanesulfonic acid, propanesulfonic acid, sulfoacetic acid, sulfosuccinic acid, benzenesulfonic acid, ethylbenzenesulfonic acid, 4-hydroxybenzenesulfonic acid, etc., but are not limited thereto.

Non-limitative examples of the polyol (ii) generating a soft segment of polyurethane include a polyesterdiol, polyetherdiol, polyacrylic diol and polycarbonate diol. When the polyol (ii) has a molecular weight less than 300 g/mole, impact resistance and optical density may be decreased. On the other hand, when the polyol (ii) has a molecular weight exceeding 6,000 g/mole, coatability may be deteriorated. Therefore, the polyol (ii) preferably has a molecular weight of 300 to 6,000 g/mole and more preferably 500 to 2,000 g/mole. Further, the amount of the polyol (ii) is preferably 10-70 parts by weight and more preferably 20-60 parts by weight, based on 100 parts by weight of the polyurethane.

Preferably, the polyol (iii) generating a hard segment of polyurethane is a low molecular weight polyol having a molecular weight of 50 to 500 g/mole. Examples of the polyol (iii) may include 1,4-butanediol, 1,2-butanediol, 1,5-pentanediol, 2,4-pentanediol, 1,4-cyclohexanediol, 1,6-hexanediol, 2,5-hexanediol, 2,4-heptanediol, pentaerythritol and trimethylolpropane, but are not limited thereto. Further, the amount of the polyol (iii) is preferably 1-50 parts by weight and more preferably 5-30 parts by weight, based on 100 parts by weight of the polyurethane.

According to the present invention, a catalyst may be used for preparing the polyurethane containing a Brønsted salt. Such catalysts include a Lewis base, a Lewis acid or an insertion reaction catalyst well known to persons skilled in the art, etc. Particular examples of the catalyst may include tin octylate, dibutyltin diacetate, dibutyltin dilaurate, dibutyltin mercaptide, dibutyltin dimaleate, dimethyltin hydroxide, triethylamine, etc., but are not limited thereto.

Preferably, the Brønsted salt in the polyurethane exists in the ratio of 10 to 100 gram equivalents per $1 \times 10^6$ g of polyurethane. Although the Brønsted salt exists in such a small amount, it provides polar environment to a photochromic dye so that optical density can be improved.

In the polyurethane containing a Brønsted salt, isocyanate and polyol are present in such an amount that the mole ratio between both functional groups of NCO and OH, i.e., NCO/OH ranges preferably from 0.5 to 3.0 and more preferably from 0.75 to 2.0. If the mole ratio is less than 0.5, the coating layer formed by the primer coating composition cannot be cured sufficiently. On the other hand, if the mole ratio between both functional groups is more than 3.0, unreacted isocyanate may exist and thus have possibility to react with an upper hard coating layer, thereby detracting from the performance and appearance of the hard coating layer.

The amount of the polyurethane reaction mixture containing an isocyanate with a polyol or the polyurethane is preferably 5 to 90 parts by weight based on 100 parts by weight of the total primer composition. If the amount is less than 5 parts by weight, impact resistance and optical density may be decreased, while the amount is more than 90 parts by weight, activation/bleaching rate becomes low and adhesive property may be decreased.

According to the primer composition of the present invention, it is preferable that the second component, i.e., the polyepoxy resin is linear and has a molecular weight of about 300-2,000 g/mole. Epoxy groups in the epoxy resin can react with hydroxy groups present in the polyurethane reaction mixture or polyurethane. This results in ring-opening of epoxy groups simultaneously with the generation of new OH groups, which in turn can react with NCO groups present in the isocyanate to form urethane bonds that may become a part of the polyurethane. Additionally, unreacted epoxy groups may react with OH groups present in an upper hard coating layer so that the primer layer can be in close contact with the hard coating layer. Further, use of the polyepoxy component result in the formation of an additional free space in the primer layer formed by the primer composition according to the present invention. Therefore, the chemical structural change of a photochromic dye may be facilitated and thus activation/bleaching rate may be increased.

Preferably, the amount of the polyepoxy resin is 5 to 50 parts by weight based on 100 parts by weight of the total primer composition. If the amount is less than 5 parts by weight, adhesive property becomes poor, while if the amount is more than 50 parts by weight, coatability may be decreased.

Examples of the polyepoxy resin that may be used in the present invention include bisphenol A epoxy of Lucky Epoxy Resin, available from LG Chem., Ltd., polysulfido-modified epoxy resin Flep available from Toray Thiokol Corp., or the like. For example, polyepoxy resin LER-840, which is a typical example for the bisphenol A epoxy of Lucky Epoxy Resin, is a polyepoxy resin having two epoxy groups at both ends and comprising bisphenol A as a basic structure. It has an epoxy equivalent of 180-190 and a viscosity of 9000-11000 cps at 25° C. It also has excellent adhesive properties, low shrinkage, high chemical resistance and other advantages. Further, because it has a relatively long chain and a large molecular weight, it can form an additional free space in the structure of a primer layer. Therefore, it causes a photochromic dye to be easily changed in chemical structure, thereby increasing activation/bleaching rate and optical density.

According to the present composition, the third component for providing photochromic property may be any photochromic dyes with no particular limitation. For example, benzopyran-, naphthopyran-, phenanthropyran-, indenonaphthopyran-, fulgide, spirooxazine-, and spiropyran-based compounds may be used. One primer composition according to the present invention may include various photochromic dyes so as to exhibit various colors.

The amount of the photochromic dye is preferably 1 to 40 parts by weight based on 100 parts by weight of the total primer composition. If the amount is less than 1 part by weight, optical density is low, while if the amount is more than 40 parts by weight, coatability is poor.

The primer composition according to the present invention may dissolve in an organic solvent to apply on a transparent material. Organic solvents that may be used in the present invention include alcohols, ketones, esters and ethers. More particularly, methylethyl ketone, acetylacetone, ethylcellosolve acetate, diacetone alcohol, ethyl acetate, etc., are preferably used.

The primer composition according to the present invention may be coated on a transparent material, particularly on a plastic lens, etc. More particularly, the primer composition according to the present invention may be applied to materials including polycarbonates, acrylic resins, polydiethylene glycolbisallyl carbonate (CR-39) and polyethylene terephthalate. The primer composition according to the present invention has excellent adhesion force to the above-described materials and photochromic property with which it is activated in the outdoor environment and is bleached in the indoor environment. In order to provide a lens with a higher optical density and improved fatigue resistance when the lens is exposed to UV light, it is important to select a suitable matrix. Also, various additives (for example, a UV stabilizer such as Tinuvin available from Ciba-Geigy Japan Corp., a surfactant, etc.) may be added to the matrix.

Preferably, the primer composition according to the present invention is coated on a plastic lens by a suitable method including a dipping method, a spin coating method, etc., and then is cured at 50-150° C. for 0.5-4 hours. In order to prevent the deterioration and deformation of the plastic material due to overheating during a curing process, it is more preferable that the primer composition is cured at 90-120° C. for 0.5-4 hours.

According to the present invention, dry coating thickness may be 0.1-40 µm, preferably 1-10 µm and more preferably 2-5 µm. If the thickness is less than 2 µm, optical density is low. On the other hand, if the thickness is more than 5 µm, hardness may be decreased after applying a hard coating layer.

Since the plastic lens coated with the photochromic primer layer has a soft surface, it is preferable to apply a hard coating layer on the primer layer. Even if a hard coating layer is formed, the primer coating layer formed between the hard coating layer and the plastic lens can prevent decrease of impact resistance.

Silicone resins are preferable for a hard coating agent used for forming the hard coating layer. Preferred examples of silicone resins include compositions based on (A) inorganic oxide sol formed of nano-particles having a particle diameter of 1-100 nm including at least one element selected from the group consisting of Ti, Zr, Si, Al, Sn, Sb, Ta, Ce, La, Fe, Zn, W and In; (B) a silane compound having no functional group; and/or (c) an epoxy-containing silicone compound or hydrolyzate thereof.

The inorganic oxide sol (A) improves the hardness, heat resistance and weather resistance of a hard coating layer and increases the refractive index of a hard coating layer approximately to that of the lens so that a light interference phenomenon can be prevented. The protective coating agent including the silane compound (B) having no functional group may be a commercially available hard coating composition and is preferably ST11MS available from LG Chem., Ltd. Examples of the epoxy-containing silicone compound (C) include γ-glycidoxypropyl trimethoxysilane, γ-glycidoxypropyl methyldiethoxysilane, γ-glycidoxypropyl triethoxysilane, etc.

Methods for coating a hard coating composition on the primer coating layer include a dipping method, a flow method, a spin coating method, a spray coating method, etc., but are not limited thereto.

The hard coating layer can be formed by applying a hard coating composition onto the primer layer on the surface of a plastic lens, heating it at 80-120° C. for 1-24 hours and then curing it. The thickness of a hard coating layer is preferably 0.5 to 5 µm and more preferably 1-4 µm.

BEST MODE FOR CARRYING OUT THE INVENTION

Reference will now be made in detail to the preferred embodiments of the present invention, however the scope of the present invention is not restricted by the embodiments.

Example 1

Preparation of Primer Composition for Coating Transparent Materials 296 g of methylethyl ketone, 351 g of ethylcellosolve acetate and 164 g of acetylacetone were added to a jacketed reactor. 72 g of polyurethane, Estane 5778 available from Noveon Inc. (polyurethane containing a Brønsted salt) was added thereto and the mixture was stirred for about 1 hour. To the stirred mixture, 26.7 g of polyepoxy resin, LER-840 available from LG Chem., Ltd., was added and the resultant mixture was stirred until it is homogenized. Then, added were 12 g of a photochromic dye (naphthooxazine exhibiting a blue color when exposed to UV) and 1.4 g of Tinuvin 144 available from Ciba-Geigy Corp. as a UV stabilizer. Further, TEGO-410 and TEGO-450 available from TEGO Inc. were added as leveling agents, each in the amount of 1.57 g.

Lens Coating Using Primer Composition

A medium-refractive index lens for glasses (BS available from HANDOK Optec Co., Ltd.; refractive index 1.553) was etched in NaOH at 60° C. for 4 minutes, dipped in the coating composition obtained as described above to be coated with the coating composition and dried at 110° C. for 60 minutes.

The coated lens was further dip-coated with a silicone-based hard coating protective layer, ST11MS available from LG Chem., Ltd. and cured at 120% for 2 hours.

Example 2

308 g of methylethyl ketone, 366 g of ethylcellosolve acetate, 171 g of acetylacetone and 54.6 g of polyurethane, Estane 5778 available from Noveon Inc. were added to a jacketed reactor at room temperature and the mixture was stirred for about 1 hour. To the stirred mixture, 48.4 g of polyepoxy resin, LER-840 available from LG Chem., Ltd. was added and the resultant mixture was stirred for about 30 minutes. Then, added were 12 g of a photochromic dye (naphthooxazine exhibiting a blue color when exposed to UV) and 1.4 g of Tinuvin 144 available from Ciba-Geigy Corp. as a UV stabilizer. After stirring for about 30 minutes, TEGO-410 and TEGO-450 available from TEGO Inc. were added as leveling agents, each in the amount of 1.57 g.

Next, a medium-refractive index lens for glasses was coated with the primer composition and further coated with a hard coating protective layer, according to the same method as Example 1.

Comparative Example 1

331 g of methylethyl ketone, 393 g of ethylcellosolve acetate, 183 g of acetylacetone and 80.5 g of polyurethane, Estane 5778 available from Noveon Inc. were added to a jacketed reactor at room temperature and the mixture was stirred for about 1 hour. To the stirred mixture, 9.2 g of a photochromic dye (naphthooxazine exhibiting a blue color when exposed to UV) and 1.1 g of a UV stabilizer were added. After stirring for about 30 minutes, TEGO-410 and TEGO-450 available from TEGO Inc. were added as leveling agents, each in the amount of 1.57 g.

Next, a medium-refractive index lens for glasses was coated with the primer composition and further coated with a hard coating protective layer, according to the same method as Example 1.

Comparative Example 2

327 g of methylethyl ketone, 389 g of ethylcellosolve acetate, 181 g of acetylacetone and 110 g of polyepoxy resin, LER-840 available from LG Chem., Ltd. were added to a jacketed reactor at room temperature and the mixture was stirred for about 1 hour. To the stirred mixture, 12.4 g of a photochromic dye (naphthooxazine exhibiting a blue color when exposed to UV) and 1.4 g of a UV stabilizer were added. After stirring for about 30 minutes, TEGO-410 and TEGO-450 available from TEGO Inc. were added as leveling agents, each in the amount of 1.57 g.

Next, a medium-refractive index lens for glasses was coated with the primer composition and further coated with a hard coating protective layer, according to the same method as Example 1.

Comparative Example 3

Example 1 was repeated to provide a primer composition and a photochromic lens, except that D-ACE-606NY, polyurethane available from DONGSUNG Chemical Co., Ltd. was used instead of Estane 5778, polyurethane available from Noveon Inc.

The polyurethane, D-ACE-606NY available from DONGSUNG Chemical Co., Ltd. is a polyurethane resin having polyester functional groups. It is a one-part resin of non-yellowing type containing no Brønsted salt in its structure and having excellent liquid stability and weather resistance. It is largely used in clothes and direct coating technologies.

Comparative Example 4

50.53 g of methylethyl ketone, 50.53 g of toluene, 50.53 g of ethyl acetate, 3.27 g of linear polymeric polytetrahydrofuran having a molecular weight of 1,000, 3.25 g of 1,4-butanediol, 3.25 g of trimethoxypropane and 3.25 g of polyester, DESMOPHEN 670A 80 available from Bayer Co. (a saturated polyester resin dissolved in n-butyl acetate) were added to a jacketed reactor at room temperature and the mixture were stirred for about 1 hour. To the stirred mixture, 4 g of a photochromic dye (naphthooxazine exhibiting a blue color when exposed to UV), 1.4 g of a UV stabilizer, 85 g of VESTANAT B 1358A available from Degussa Corp. (a blocked alicyclic polyisocyanate) and 0.64 g of dibutyltin dilaurate were added. After stirring for about 30 minutes, TEGO-410 and TEGO-450 available from TEGO Inc. were added as leveling agents, each in the amount of 0.46 g.

Next, a medium-refractive index lens for glasses was coated with the primer composition and further coated with a hard coating protective layer, according to the same method as Example 1.

Experimental Example

The following experiments were performed for each lens obtained by Examples 1 and 2 and Comparative Examples 1-4. The results are shown in the following Table 1.

(1) Optical Density (ΔOD)

Cured lenses were irradiated with UV light having a wavelength of 365 nm (1.35 mW/cm$^2$) for 2 minutes. Right after this, the output light was measured for each lens at an activated state and a bleached state by using a UV-Vis detector. The optical density (ΔOD) at an activated state based on the optical density at a bleached state was calculated by the following formula:

$$\Delta OD = \log\left(\frac{T \% \text{ bleached}}{T \% \text{ activated}}\right)$$

(2) Scratch Resistance: Scratch Test with #0000 Steel Wool

Steel wool was mounted on the front-end of a cylinder having a diameter of 25 mm and contacted with the surface of a sample. They were rotated five times under a load of 100 g and then observed by the naked eye. (○: no damage on the surface, Δ: slightly damaged, X: excessively damaged).

(3) Adhesive Property

A crosscut cellotape peel test was performed for each coating in a crosslinked and cured state. More particularly, each coating was notched with 11×11 lines in the longitudinal direction and the horizontal direction by a crosscut method at the line interval of 1 mm to form 100 divisions each having an area of 1 mm². A cellotape was adhered on the notched coating and removed rapidly. Such operation was repeated three times at one position.

◯: no peeling after repeating 3 times
Δ: peeling at 1 to 50 divisions after repeating 3 times
X: peeling at 51-100 divisions after 3 times (4) Impact Resistance Steel balls having a weight of 16.32 g and 24.82 g were set at a height of 131 cm and 154 cm, respectively, and dropped downwardly to impact on the convex surface of a lens. Such a breaking test was repeated while the impact energy was gradually increased. When a lens was broken or cracked, the impact energy value at the preceding energy level was designated as impact resistance in terms of impact energy (J). According to the FDA standards, such impact energy should be 0.2 J or more.

(5) Coating Layer Thickness

The section of a coated lens was observed with a FE-SEM (field emission scanning electron microscope) to determine a coating layer thickness.

TABLE 1

| Item | Ex. 1 | Ex. 2 | Comp. Ex. 1 | Comp. Ex. 2 | Comp. Ex. 3 | Comp. Ex. 4 |
|---|---|---|---|---|---|---|
| $\Delta OD_{max}{}^{1)}$ | 0.91 | 0.78 | 0.38 | 0.12 | 0.24 | 0.27 |
| $\lambda_{max}{}^{2)}$ (nm) | 619 | 620 | 619 | 608 | 603 | 601 |
| $t_{1/2}{}^{3)}$ (sec) | 42 | 32 | 45 | 24 | 18 | 30 |
| Scratch resistance | ◯ | ◯ | ◯ | X | ◯ | ◯ |
| Adhesive property | ◯ | ◯ | X | X | ◯ | X |
| Impact resistance (J) | ≧0.37 | ≧0.37 | 0.37 | ≦0.21 | 0.37 | 0.23 |
| Primer coating layer thickness (μm) | 4.0 | 3.6 | 3.8 | 2.7 | 3.5 | 2.9 |
| Hard coating layer thickness (μm) | 3.7 | 3.5 | 2.8 | 3.5 | 3.0 | 3.1 |

$^{1)}\Delta OD_{max}$: optical density calculated by using transmissions in an activated state and in a bleached state [log(T % bleached/T % activated)]
$^{2)}\lambda_{max}$: value of the wavelength at which point transmission is the lowest in the visible light range after exposure to UV
$^{3)}t_{1/2}$: half-time of bleaching rate. Time needed for recovering the optical density to ½ of the initial value when UV is protected after exposure to UV As shown in Table 1, Examples 1 and 2 show excellent optical density values compared to Comparative Examples 1-4. Additionally, each primer coating layer formed by the primer coating compositions according to Examples 1 and 2 has $t_{1/2}$ (half-time of bleaching rate) of 90 seconds or less and thus is acceptable as a primer coating.

INDUSTRIAL APPLICABILITY

As mentioned above, conventional photochromic primer coatings formed on plastic materials by using a photochromic dye have disadvantages in that they have a low optical density and a low bleaching rate. However, as can be seen from the foregoing, the primer composition according to the present invention comprising a polar polyurethane containing a Brønsted salt, a polyepoxy resin and a photochromic dye shows a high optical density and a high activation/bleaching rate when coated on a plastic lens.

The invention claimed is:

1. A primer composition for coating transparent materials, comprising:
   a) 5-90 parts by weight of a polyurethane containing a Brønsted salt;
   b) 5-50 parts by weight of a polyepoxy resin; and
   c) 1-40 parts by weight of a photochromic dye, based on 100 parts by weight of the total primer composition.

2. The primer composition for coating transparent materials according to claim 1, wherein the Brønsted salt is present in the polyurethane containing a Brønsted salt in an amount of 10-100 gram equivalents per $1 \times 10^6$ g of the polyurethane.

3. The primer composition for coating transparent materials according to claim 1, wherein the polyurethane containing a Brønsted salt is a reaction product of an isocyanate with a polyol, the isocyanate and polyol being present in such an amount that the mole ratio between both functional groups of NCO and OH(NCO/OH) ranges from 0.5 to 3.0.

4. The primer composition fox coating transparent materials according to claim 1, wherein the polyurethane containing a Brønsted salt is a reaction product of an isocyanate with a polyol, the isocyanate being selected from the group consisting of an aliphatic isocyanate, an alicyclic isocyanate, an aromatic isocyanate, a heterocyclic isocyanate, a blocked aliphatic isocyanate and a blocked alicyclic isocyanate.

5. The primer composition for coating transparent materials according to claim 1, wherein the polyurethane containing a Brønsted salt is a reaction product of an isocyanate with a polyol, the polyol including: (i) a diol containing a Brønsted salt, (ii) a polyol generating a soft segment of polyurethane, and (iii) a polyol generating a hard segment of polyurethane.

6. The primer composition for coating transparent materials according to claim 5, wherein the diol containing a Brønsted salt is a reaction product of an aminodiol with a Brønsted acid.

7. The primer composition for coating transparent materials according to claim 6, wherein the aminodiol is selected from the group consisting of 2-amino-2-methyl-1,3-propanediol, N-(n-butyl)diethanolamine, 3-diethyl-amino-1,2-propanediol, N-(t-butyl)diethanolamine, N-methyldiethanolamine, N-phenyldiethanolamine and diethyl N,N-bis(2-hydroxyethyl)aminomethyl phosphonate.

8. The primer composition for coating transparent materials according to claim 6, wherein the Brønsted acid is selected from the group consisting of phosphonic acid, phosphinic acid and sulfonic acid.

9. The primer composition for coating transparent materials according to claim 5, wherein the polyol generating a soft segment of polyurethane is selected from the group consisting of a polyester diol, a polyether diol, a polyacrylic diol and a polycarbonate diol.

10. The primer composition for coating transparent materials according to claim 5, wherein the polyol generating a hard segment of polyurethane is selected from the group consisting of 1,4-butanediol, 1,2-butanediol, 1,5-pentanediol, 2,4-pentanediol, 1,4-cyclohexanediol, 1,6-hexanediol, 2,5-hexanediol, 2,4-heptanediol, pentaerythritol and trimethylolpropane.

11. The primer composition for coating transparent materials according to claim 1, wherein the polyurethane containing a Brønsted salt is a polyurethane reaction mixture containing an isocyanate and a polyol.

12. The primer composition for coating transparent materials according to claim 1, wherein the polyepoxy resin is linear and has a molecular weight of 300-2,000 g/mole.

13. The primer composition for coating transparent materials according to claim 1, wherein the photochromic dye is selected from the group consisting of benzopyran-, naphthopyran-, phenanthropyran-, indenonaphthopyran-, fulgide, spirooxazine-, and spiropyran-based compounds.

14. A photochromic transparent material having a primer layer formed by coating and curing the primer composition according to claim 1 on a surface of a transparent material.

15. The photochromic transparent material according to claim 14, wherein the primer layer has a thickness of 0.1 μm to 40 μm.

16. The photochromic transparent material according to claim 14, wherein a hard coating layer is formed on the primer layer.

17. The photochromic transparent material according to claim 16, wherein the hard coating layer comprises at least one component selected from the group consisting of at least one inorganic oxide sol containing at least one element selected from the group consisting of Ti, Zr, Si, Al, Sn, Sb, Ta, Ce, La, Fe, Zn, W and In; a silane compound having no functional group; and an epoxy-containing silicone compound or hydrolyzate thereof.

* * * * *